United States Patent [19]

McCormick

[11] 4,178,057

[45] Dec. 11, 1979

[54] CLIP FOR FIXING AN ELECTRIC CABLE TO A SUPPORT STRUCTURE

[75] Inventor: Mathew McCormick, East Didsbury, England

[73] Assignee: Bowthorpe-Hellermann Limited, Crawley, England

[21] Appl. No.: 856,965

[22] Filed: Dec. 2, 1977

[30] Foreign Application Priority Data

Dec. 8, 1976 [GB] United Kingdom ............... 51280/76

[51] Int. Cl.² ............................................ H01R 13/58
[52] U.S. Cl. .............................. 339/103 M; 174/65 R; 174/135; 339/219 F; 339/263 R
[58] Field of Search ................. 174/65 R, 65 G, 135, 174/153 G; 339/103 M, 103 B, 103 C, 104, 105, 17 R, 17 C, 219 F, 263 R

[56] References Cited

U.S. PATENT DOCUMENTS

| 3,573,720 | 4/1971 | Reynolds | 339/103 M |
| 4,056,252 | 11/1977 | Simon | 339/103 B X |

FOREIGN PATENT DOCUMENTS

| 2259667 | 6/1974 | Fed. Rep. of Germany | 174/65 R |
| 2316747 | 10/1974 | Fed. Rep. of Germany | 174/153 G |

Primary Examiner—Roy Lake
Assistant Examiner—DeWalden W. Jones
Attorney, Agent, or Firm—Lawrence E. Laubscher

[57] ABSTRACT

A clip for fixing an electric cable to a support structure, as for clamping the cable to an electrical appliance as it passes into the appliance, includes terminals for terminating respective conductors of the cable within the appliance. The clip comprises two portions of synthetic plastics material which are drawn together by a screw to clamp the cable end, which screw serves also to secure the clip to the support structure, the terminals being provided on one of the clip portions.

6 Claims, 5 Drawing Figures

CLIP FOR FIXING AN ELECTRIC CABLE TO A SUPPORT STRUCTURE

BACKGROUND OF THE INVENTION

This invention relates to a clip for fixing an electric cable to a support structure, particularly for clamping a cable passing into an electrical appliance.

In the case of a cable passing into an electrical appliance, it is important for the cable to be securely clamped to that appliance so that the cable will not be pulled free. British patent specification No. 1 070 214 describes and claims an effective clip, having a hollow, tubular body portion through which the cable passes, and a clamping portion to be introduced into one end of the body portion: the two portions are drawn together by a screw so that the clamping portion clamps the cable against an inclined inside surface of the body portion, the screw also serving to secure the clip to a support structure.

Often, the power supply cable entering an appliance is terminated just inside the appliance, and other internal electrical leads are connected to such terminations. The metal terminals used must be securely fixed to insulating support structures.

SUMMARY OF THE INVENTION

This invention provides a clip for fixing an end of an electric cable to a support structure, the clip comprising two portions of synthetic plastics material which are drawn together by a screw to clamp the cable end, the screw serving also to secure the electrical cable to the support structure, one of the portions having at least two electrical terminals secured thereto for terminating respective conductors of the cable.

Preferably, the two portions comprise a body portion and a clamping portion together formed as a one-piece molding, being united by an elongate, flexible strap. Preferably, each metal terminal includes a portion bent into U-section channel shape from sheet metal, the two opposite walls having apertures in which are located projections from the plastics body portion, these projections serving to retain the metal terminal. Preferably, such projections are formed on the opposite walls of a U-section channel portion of the respective body portion extension.

BRIEF DESCRIPTION OF THE FIGURES

Embodiments of the cable fixing clip will now be described, by way of examples only, with reference to the accompanying drawings, in which.

DETAILED DESCRIPTION

Figure 1:
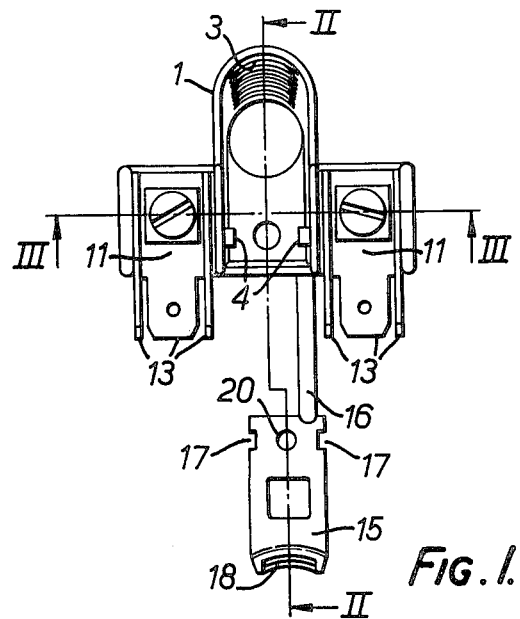
FIG. 1 is a plan view of a cable fixing clip.
Figure 2:
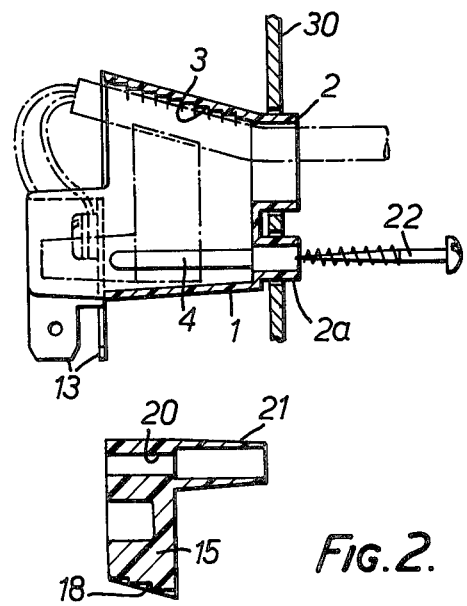
FIG. 2 is a section on the line II—II of FIG. 1.
Figure 3:
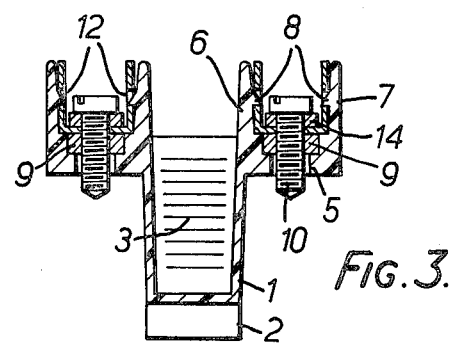
FIG. 3 is a section on the line III—III of FIG. 1.

Referring to FIGS. 1 to 3 of the drawings, there is shown a cable fixing clip formed as a one-piece molding of synthetic plastics material and having two metal terminals secured thereto. The one-piece molding comprises a hollow, tubular body portion 1 having a generally rectangular opening at its upper end and a circular opening 2, formed as a tubular extension, at its lower end. A curved interior surface 3, provided with transverse serrations, extends from top to bottom of the body portion, along an inclined line, the body portion being wider at the top than at the bottom. The inside opposite side walls of the body portion are provided with respective parallel ribs 4 extending from top to bottom of the body portion. The bottom end of the body portion is provided with a small circular opening, in the form of a tubular extension 2a.

At its top end, the opposite side walls of the body portion are provided with respective extensions to which respective metal terminals are secured. Each such extension is in the form of a U-shaped channel, with a floor 5 co-planar with the top end of the clip, an inner wall 6 forming an extension of the main side wall of the body portion, and a parallel outer wall 7. The two extensions are disposed remote from the curved end 3 of the body portion. The two side walls 6,7 are provided with projections 8 having inclined surfaces as shown in FIG. 3. The floor 5 is recessed to receive and locate a square nut 9 with which a terminal screw 10 is engageable, and a circular aperture to receive the end of the screw 10, either freely or in self-tapping relation.

As shown, each metal terminal 11 is formed from sheet metal bent into U-section. One end portion is provided with rectangular apertures 12 in the opposite side walls, for location of the projections 8 therein, the floor of this portion of the terminal setting on the floor 5 of the synthetic plastics body portion extension. By virtue of the inclined surfaces on the projections 8 and the slight resilience of the synthetic plastics (preferably nylon), the terminal is snap-engageable with the extension. The terminal has an opposite end portion, wherein each of the two opposite side walls and the floor are formed as blades 13 for receiving complementary socket-type terminals of connecting leads (not shown). The floor of the one end portion of the terminal is provided with a circular aperture through which the terminal screw 10 extends. A terminal washer 14 is also provided, as shown.

The clip also comprises a clamping portion 15 which is united to the body portion by an elongate flexible strap 16. The clamping portion is arranged to enter the open top end of the body portion and opposite sides thereof are provided with grooves 17 for the ribs 4 to locate slidingly within. The clamping portion has a concavely curved end surface 18, formed on an incline so as to lie parallel to the surface 3 of the body portion, and provided with transverse serrations. The clamping portion is provided with a through-bore 20, communicating with the larger diameter interior of a tubular extension 21.

In use, the tubular extensions 2,2a at the bottom end of the body portion are registered in complementary openings in a support structure, such as a panel 30. A power supply cable is passed through the body portion, from the bottom end thereof, and the clamping portion is bent around on its flexible strap and pushed into the open top end of the body portion, so that the ribs 4 locate within the grooves 17. A self-tapping screw 22 is inserted through the body portion extension and engages within the through-bore 20 of the clamping portion. As this screw 22 is tightened, the clamping portion is drawn further into the body portion and securely clamps the cable against the interior surface 3 of the body portion. The screw 22 also flattens the extension onto the supporting structure, thus serving to secure the clip to the latter. The individual leads of the cable are connected to the terminals 11 by means of the terminal screws 10, and other suitable terminated connecting leads may be engaged with the terminal blades.

Figure 4:
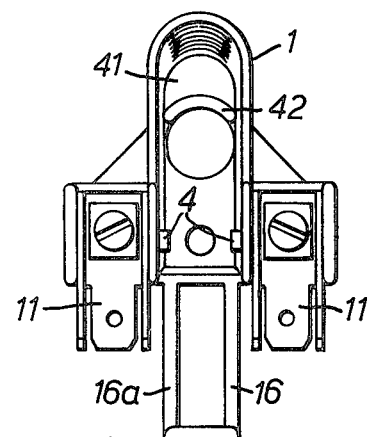
FIG. 4 is a plan view of a second embodiment of cable fixing clip.
Figure 5:
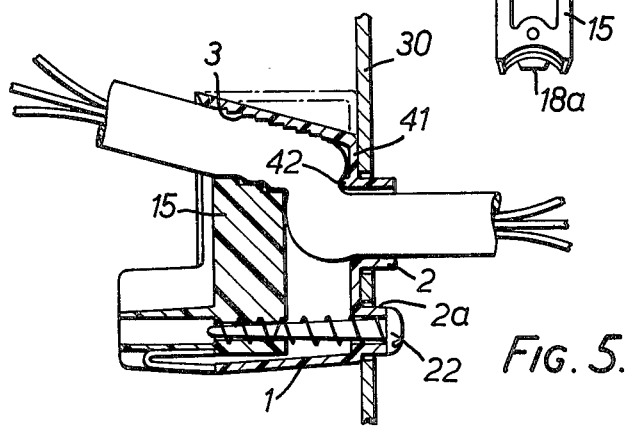
FIG. 5 is a section, similar to that of FIG. 2, through the clip of FIG. 4.

Referring now to FIGS. 4 and 5, a modified clip is shown wherein the bottom end of the tubular body portion is partially closed by an end wall portion 41 of the body, which end wall portion 41 is provided internally with a restraint bar or ledge 42 circumferential to the circular aperture through which the cable passes. When the clamping screw draws the clamping portion into effect, the cable is bent over this ledge 42 to enhance the clamping. Indeed, the interior surface 3 of the body portion need not be inclined but may instead lie parallel to the clamping screw 22 (as indicated in outline), so that the cable is clamped only by being bent over the ledge 42. Also in this second embodiment, the clamping portion is united to the body portion by two parallel straps 16,16a and its end surface 18 is profiled as shown, with projections 18a in the middle of each serration, to improve the grip thereof upon the cable.

The advantages of these embodiments of clips will be readily appreciated. The clip is simple and inexpensive to manufacture because it comprises a one-piece synthetic plastics molding and terminals which are assembled to the clip by snap-engagement. The clip is easily and quickly installed, saving time and cost, because it not only secures the cable end but also terminates the conductors of the cable, so that no separate terminal block is needed. As an additional benefit, this saves space within the electrical appliance. In order to install the clip, only the single screw 22 needs to be tightened, simultaneously securing the clip to the appliance and clamping the cable.

What we claim is:

1. A clip for securing one end of a multi-conductor electric cable to a support panel, comprising
(a) a generally trapezoidal hollow body member the larger forward end of which contains a recess defining a chamber, the upper and lower walls of said chamber diverging outwardly from the rear wall of said chamber toward the forward end of said body member, (1) said body member rear wall containing a pair of openings surrounded by outwardly extending cylindrical collar portions, respectively, said collar portions being adapted to be received by corresponding openings contained in said support panel;
(2) said body member also including adjacent its forward end a pair of laterally outwardly extending projecting portions;
(b) a closure member adapted for insertion within, and having external walls corresponding with the walls of, said recess chamber, said closure member including a bore arranged colinearly with a first one of said rear wall openings;
(c) a pair of electrical terminals mounted on the forward portions of said projecting portions, respectively, said terminals being so arranged that when a cable is inserted into the recess through the other one of said openings, the cable conductors extend forwardly from the recess for connection with said terminals, respectively; and
(d) screw means extending through said first opening and into said bore for drawing said closure member into said recess, thereby to clamp said cable between corresponding wall surfaces of said closure member and the recess chamber wall, said screw means including a head portion having a greater diameter than said first opening, whereby upon tightening said screw means, said head portion flattens the extension defined by said collar portion associated with said first opening to connect the clip with said support panel.

2. A clip as defined in claim 1, wherein each of said projecting portions comprises a U-shaped channel, the bottom portion of each of said channels being co-planar with said recess chamber forward end, the side wall portions of each of said channels extending forwardly, the inner side wall portion of each of said channels extending continuously from the opposite side walls of said chamber.

3. A clip as defined in claim 2, wherein said pair of electrical terminals each comprises U-shaped sheet metal adapted to be received in contiguous relation within said channels, respectively.

4. A clip as defined in claim 3, and further comprising means for connecting said pair of electrical terminals within said channels including projections arranged on the inner surfaces of said channel side walls for engaging corresponding recesses in the side walls of said terminals.

5. A clip as defined in claim 1, wherein said pair of electrical terminals each includes a screw clamp for connection of the forward ends of the cable conductors, respectively, said terminals further including blade projection portions for insertion into a complementary electrical socket.

6. A clip for securing one end of a multi-conductor electric cable to a support panel, comprising
(a) a generally trapezoidal hollow body member the larger forward end of which contains a recess defining a chamber, the upper and lower walls of said chamber diverging outwardly from the rear wall of said chamber toward the forward end of said body member,
(1) said body member rear wall containing a pair of openings adapted for alignment with corresponding openings contained in said support panel,
(2) said body member also including adjacent its forward end a pair of laterally outwardly extending projecting portions;
(b) a closure member adapted for insertion within, and having external walls corresponding with the walls of, said recess chamber, said closure member including a bore arranged colinearly with a first one of said rear wall openings;
(c) a pair of electrical terminals mounted on the forward portions of said projecting portions, respectively, said terminals being so arranged that when a cable is inserted into the recess through the other one of said openings, the cable conductors extend forwardly from the recess for connection with said terminals, respectively; and
(d) screw means extending through said first opening and into said bore for drawing said closure member into said recess, thereby to clamp said cable between corresponding wall surfaces of said closure member and the recess chamber wall, said screw means including a head portion having a greater diameter than said first opening, whereby upon tightening said screw means, said head portion is pressed in contiguous relation with said support panel to connect the clip therewith.

* * * * *